US007003466B2

(12) United States Patent
Brown et al.

(10) Patent No.: US 7,003,466 B2
(45) Date of Patent: Feb. 21, 2006

(54) DESTINATION DEVICE INITIATED CALLER IDENTIFICATION

(75) Inventors: Michael Wayne Brown, Georgetown, TX (US); Joseph Herbert McIntyre, Austin, TX (US); Michael A. Paolini, Austin, TX (US); James Mark Weaver, Austin, TX (US); Scott Lee Winters, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 736 days.

(21) Appl. No.: 10/015,265

(22) Filed: Dec. 12, 2001

(65) Prior Publication Data

US 2003/0110039 A1 Jun. 12, 2003

(51) Int. Cl.
*G10L 21/00* (2006.01)
(52) U.S. Cl. .................... 704/275; 704/270.1; 704/246
(58) Field of Classification Search ................ 704/246; 379/38, 265.02, 142; 455/415
See application file for complete search history.

(56) References Cited

U.S. PATENT DOCUMENTS

| 5,499,288 A | * | 3/1996 | Hunt et al. ............... 379/88.02 |
| 5,646,839 A | * | 7/1997 | Katz ...................... 379/142.11 |
| 5,673,404 A |   | 9/1997 | Cousins et al. ............. 395/347 |
| 5,790,637 A |   | 8/1998 | Johnson et al. ............... 379/67 |
| 5,915,001 A |   | 6/1999 | Uppaluru .................. 379/88.22 |
| 5,940,476 A |   | 8/1999 | Morganstein et al. ..... 379/88.02 |
| 5,946,654 A |   | 8/1999 | Newman et al. ............ 704/246 |
| 6,038,305 A |   | 3/2000 | McAllister et al. ......... 379/207 |
| 6,058,364 A |   | 5/2000 | Goldberg et al. ........... 704/252 |
| 6,101,242 A |   | 8/2000 | McAllister et al. ...... 379/88.02 |
| 6,122,357 A |   | 9/2000 | Farris et al. ................ 379/207 |
| 6,178,230 B1 |   | 1/2001 | Borland ...................... 379/67.1 |
| 6,246,988 B1 | * | 6/2001 | Schier ......................... 704/273 |
| 6,408,272 B1 | * | 6/2002 | White et al. .............. 704/270.1 |
| 6,456,698 B1 | * | 9/2002 | Morganstein et al. ..... 379/88.02 |
| 6,463,127 B1 | * | 10/2002 | Maier et al. ................... 379/38 |
| 6,480,599 B1 | * | 11/2002 | Ainslie et al. ......... 379/265.02 |
| 6,785,379 B1 | * | 8/2004 | Rogers et al. .......... 379/265.02 |
| 6,819,945 B1 | * | 11/2004 | Chow et al. ................ 455/567 |
| 6,901,255 B1 | * | 5/2005 | Shostak ................... 455/422.1 |
| 2002/0064264 A1 | * | 5/2002 | Lung et al. ............. 379/142.01 |
| 2002/0118807 A1 |   | 8/2002 | Pedersen |

FOREIGN PATENT DOCUMENTS

| EP | 0585004 A2 | 3/1994 |
| EP | 0676882 A2 | 10/1995 |
| JP | 8139797 A | 5/1996 |
| JP | 10294784 A | 11/1998 |

OTHER PUBLICATIONS

WPAT Derwent 1994-067503.
WPAT Derwent 1995-346415.
WPAT Derwent 1996-315499.
WPAT Derwent 1999-031530.

* cited by examiner

*Primary Examiner*—W. R. Young
*Assistant Examiner*—Minerva Rivero
(74) *Attorney, Agent, or Firm*—John Biggers; Mark S. Walker; Biggers & Ohanian, LLP

(57) ABSTRACT

A method, system, and program for origin device initiated caller identification are provided. In response to detecting a call extended to a destination device, extending a request from said destination device to an origin device requesting a voice utterance of the caller at said origin device. A caller identity associated with the voice utterance is identified at the destination device, such that a callee receiving the call at the destination device is informed of the caller identity before choosing whether to speak with the caller.

2 Claims, 5 Drawing Sheets

DESTINATION DEVICE INITIATED CALLER IDENTIFICATION

CROSS-REFERENCE TO RELATED APPLICATIONS

The present application is related to the following co-pending applications:
(1) U.S. patent application Ser. No. 10/015,381;
(2) U.S. patent application Ser. No. 10/015,281;
(3) U.S. patent application Ser. No. 10/015,267;
(4) U.S. patent application Ser. No. 10/015,282; and
(5) U.S. patent application Ser. No. 10/015,280.

BACKGROUND OF THE INVENTION

1. Technical Field

The present invention relates in general to telecommunications and, in particular, to voice identification. Still more particularly, the present invention relates to initiating authentication of the identity of a caller at a destination device.

2. Description of the Related Art

Telephone service has created communication channels worldwide, and those channels continue to expand with the advent of cellular and other wireless services. A person can simply take a telephone off-hook and dial a destination number or press a send button and be connected to a telephone line around the world.

While telephones provide important communication abilities between people, there is also the problem of persons and businesses that intrude into oneIs home or workplace via the telephone. To alleviate the problem of unwanted callers, callees may allow an answering machine to answer all calls and then wait for a person to say who they are when leaving a message, before answering only those calls desired by the callee. However, many phone subscribers opt for a messaging service, rather than attaching an answering machine device to a telephone line, where the messaging service does not play a message to the caller while the message is being recorded.

Alternatively, a caller identification (caller ID) that identifies the wireline or wireless number from which a call is received, may be transferred with a call to a destination device.

In addition, the subscriber to that wireline or wireless number may be identified. However, the information given to a callee at the destination device only indicates the identity of the subscriber to a line and does not indicate the identity of the person making a call. In addition, a subscriber may now select an additional service that blocks the caller ID for a subscriber number from being transferred to a destination device.

Therefore, in view of the foregoing, it would be advantageous to provide a method, system, and program for identifying a caller, rather than the number for the wireline or wireless service from which a call is made. In particular, it would be advantageous for a destination device to identify the caller identity of a caller placing a call, such that the callee may decide whether to answer the call or not before speaking with the caller.

SUMMARY OF THE INVENTION

In view of the foregoing, it is therefore an object of the present invention to provide an improved telecommunications system.

It is another object of the present invention to provide a method, system and program for improved voice identification.

It is yet another object of the present invention to provide a method, system and program for initiating authentication of the identity of a caller at a destination device.

According to one aspect of the present invention, in response to detecting a call extended to a destination device, extending a request from said destination device to an origin device requesting a voice utterance of the caller at said origin device. A caller identity associated with the voice utterance is identified at the destination device, such that a callee receiving the call at the destination device is informed of the caller identity before choosing whether to speak with the caller.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
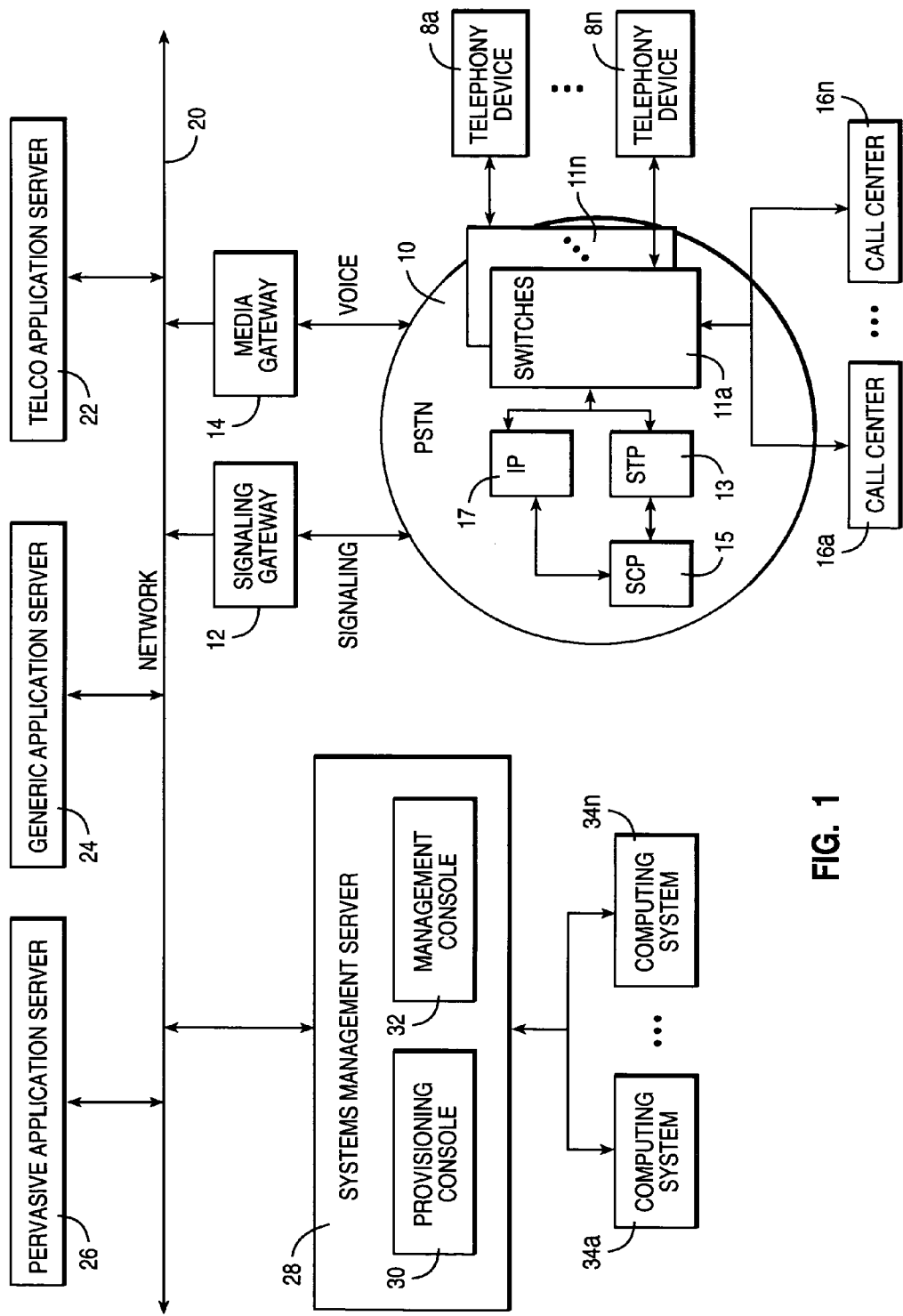
FIG. 1 depicts a block diagram of a network environment in which the present invention may be implemeted.

A method, system, and program for destination device initiated caller identification are provided. By authenticating a caller identity at a destination device, the callee is enabled to decide whether to answer a call from a specific caller.

According to one advantage of the present invention, the caller identity is authenticated by matching a caller spoken utterance with a voice sample stored at the destination device or a third party server. However, while voice authentication is described as the preferred method of identification, other methods of identification such as a password entry, a smart card entry, a biometric entry, or other security identification entries may be utilized.

Another advantage of the destination device performing caller identity authentication is that a destination device may store an address book of voice samples for preferred callers. If a caller cannot be identified within the address book of voice samples, then the a third party server of voice samples may be accessed or the caller may be prompted to provide a voice sample for use in future authentication by the destination device.

While in the present invention, authentication of a caller identity is described with emphasis placed on voice authentication, other methods of caller identity authentication may also be performed. Voice samples utilized for voice authentication are just one of multiple types of biometric sampling. For example, a caller may locally provide an eye scan, a fingerprint, and other biophysical identifiers that are transmitted within or outside the trusted network to authenticate the identity of the caller. Alternatively, keypad entries, such as a pin code, credit card account number, password, or other secure transaction key may be entered by a caller and utilized to authenticate the identity of the caller.

In addition, while in the present invention, authentication of a caller identity is described with emphasis upon performing authentication at the beginning of a call, authentication of a caller identity may be performed continuously throughout a call, at selected points throughout a call, and after a call. Selected points where authentication may be performed include when an additional phone pick-up is detected, when a new voice is detected at the origin device, when a call is transferred from one telephone device to another, and other routing of a call that may result in a new caller or in a call being recorded.

Further, while the present invention is described with emphasis upon a caller identity authentication being made for a call to continue, a call may also continue without caller identity authentication. However, where a caller is not identifiable, it may be advantageous to automatically log that the caller lacks proper identification and automatically record calls that lack proper callee identification.

For purposes of the present invention, telephony devices are termed origin devices when utilized for origination of a call to an intermediary device and are termed destination devices when utilized for receipt of a call from an intermediary device. Subscribers to a call are termed callers when originating a call and are termed callees when receiving a call. Callers and callees may or may not be line subscribers to the particular telephony device utilized.

In the following description, for the purposes of explanation, numerous specific details are set forth to provide a thorough understanding of the present invention. It will be apparent, however, to one skilled in the art that the present invention may be practiced without these specific details. In other instances, well-known structures and devices are shown in block diagram form to avoid unnecessarily obscuring the present invention.

With reference now to the figures, and, in particular, with reference now to FIG. 1, there is depicted a block diagram of a network environment in which the present invention may be implemented. While the present invention is described with reference to one type of network environment, it will be understood by one with skill in the art that the present invention may be implemented in alternate types of network environments.

General Network Environment

First, the network environment incorporates a Public Switching Telephone Network (PSTN) 10. As is known in the art the core of PSTN 10 may include multiple telephone networks, each owned by one of multiple independent service providers. Each telephone line is carried by an independent service provider within PSTN 10 and is typically assigned to at least one subscriber.

Switching of a call within an independent service providers telephone network is considered trusted movement within a trusted network because the call remains within the companyIs telephone network infrastructure. However, calls may be transferred from one service providerIs telephone network to another service providerIs telephone network in generally trusted movement. Generally, service providers are in competition with one another and therefore there is general trust in transferring a call, but not trust in sharing of subscriber information beyond a subscriber number and name from one service provider to the next without security features or other arrangements.

Advantageously, each telephone network within PSTN 10 may access a data network functioning as an extension to PSTN 10 via an Intranet. Data networks may include, for example, subscriber profiles, billing information, and preferences that are utilized by a service provider to specialize services. Transfer of information between a service providers data network and telephone network is trusted movement in sharing of information.

Further, each telephone network within PSTN 10 may access server systems external to PSTN 10 in the Internet Protocol over the Internet or an Intranet. Such external server systems may include an enterprise server, an Internet service provider (ISP), an access service provider (ASP), a personal computer, and other computing systems that are accessible via a network. In the present embodiment, transfer of information between PSTN 10 and server systems accessible via network 20 is totally untrusted and therefore may require authentication and additional security.

In the present invention, network 20 may comprise a private network, Intranet, or a public Internet Protocol network. Specifically, telco application server 22, generic application server 24, pervasive application server 26, and systems management server 28 represent server systems external to PSTN 10 that may be accessed by PSTN 10 over network 20.

In particular, telco application server 22 preferably includes multiple telco specific service applications for providing services to calls transferred to a server external to PSTN 10. In particular, a call may be transferred from PSTN 10 to telco application server 22 to receive at least one service and then the call is transferred back to PSTN 10. Such services may also be provided to calls within PSTN 10, however placing such services at a third party such as telco application server 22, is advantageous because adding services and information to PSTN 10 is time consuming and costly when compared with the time and cost of adding the services through telco application server 22.

In accord with an advantage of the present invention, as will be further described, the identity of both the caller and the callee may be authenticated by one of telephony devices 8a–8n, PSTN 10, or by telco application server 22. By authenticating the actual identity of the person making a phone call and the person receiving the phone call, rather than the identification of a device from which a call is made and received, an enhanced specialization of services to subscribers may be performed.

An authentication service within telco application server 22 may include identification and verification of the identity of a caller and/or callee of a particular call. Such a service may require that subscribers provide voice samples when setting up a subscription. The stored voice samples may then be compared against voice samples received for a particular call in order to authenticate the identity of a current caller or callee of the particular call.

Generic application server 24 preferably accesses independent server systems that provide services. For example, a messaging server, a financial server, an Internal Revenue Service (IRS) server, and database management system (DBMS) server may be accessed in HTTP via network 20. Each of these servers may include a telco service application that requires authentication of the subscriber before access is granted. For example, a financial server may provide a telco service application that allows an authenticated subscriber to access current financial records and request stock quotes from the financial server.

Pervasive application server 26 manages services for wirelessly networked devices. In particular, pervasive application server 26 preferably handles distribution of wireless packets of voice and data to wirelessly networked devices utilizing a standard such as short messaging service (SMS) messaging or other 3G standards.

Systems management server 28 manages subscriber personalization via the web. In particular, systems management server 28 includes browser technology that includes a provisioning console 30 for establishing a subscriber profile and a management console 32 for managing and updating the subscriber profile. A subscriber preferably accesses the consoles of systems management server 28 via the Internet utilizing a computing system, such as computing systems 34a–34n.

The subscriber profile may be accessed at systems management server 28 by other external servers and PSTN 10 via network 20. In addition, a local copy of a subscriber profile updated in systems management server 28 may be stored within a particular service providers data network or telephone network. Each service provider may specify the types of preferences and other information included within a subscriber profile.

In particular, a subscriber may provide a voice imprint when establishing a subscriber profile through provisioning console 30. Other types of authentication information may also be provided including, but not limited to, a password, an eye scan, a smart card ID, and other security devices. In addition, a subscriber may designate billing preferences, shopping preferences, buddy list preferences, and other preferences that enable specialized service to the subscriber when the subscriberIs identity is authenticated from the voice imprint or other identification.

Advantageously, a management agent is built into each external server to monitor the services provided by each server according to the authenticated subscriber receiving the services. By monitoring service output according to subscriber, the subscriber may then be billed according to each use of a service.

PSTN 10 preferably includes both voice and data signaling networks that interface with network 20 via gateways. Each of the gateways acts as a switch between PSTN 10 and network 20 that may compress a signal, convert the signal into Internet Protocol (other protocol) packets, and route the packets through network 20 to the appropriate server.

In particular, the voice network interfaces with network 20 through media gateway 14 which supports multiple protocol gateways including, but not limited to, SIP. SIP is a signaling protocol for Internet conferencing, telephony, presence, events notification and instant messaging.

In addition, in particular, the data signaling network interfaces with network 20 through signaling gateway 12 which supports multiple protocol gateways including, but not limited to, parlay protocol gateways and SS7 protocol gateways. Internet servers, such as telco application server 22 may include protocol agents that are enabled to interact with multiple protocols encapsulated in Internet Protocol packets including, but not limited to, SS7 protocol, parlay protocol, and SIP.

Identity Authentication and Call Control

Looking into PSTN 10, a telephone network typically includes multiple switches, such as central office switches 11a–11n, that originate, terminate, or tandem calls. Central office switches 11a–11n utilize voice trunks for transferring voice communications and signaling links for transferring signals between signaling points.

Between signaling points, one central office switch sends signaling messages to other central office switches via signaling links to setup, manage, and release voice circuits required to complete a call. In addition, between signaling points, central office switches 11a–11n query service control points (SCPs) 15 to determine how to route a call. SCPs 15 send a response to the originating central office switch containing the routing number(s) associated with the dialed number.

SCPs 15 may be general purpose computers storing databases of call processing information. While in the present embodiment SCPs 15 are depicted locally within PSTN 10, in alternate embodiments SCPs 15 may be part of an extended network accessible to PSTN 10 via a network.

One of the functions performed by SCPs 15 is processing calls to and from various subscribers. For example, an SCP may store a record of the services purchased by a subscriber, such as a privacy service. When a call is made to the subscriber, the SCP provides record of the privacy service to initiate an announcement to a caller to identify themself to the subscriber with the privacy service who is being called. According to an advantage of the invention, authentication of the subscriber receiving the call may be required before the privacy service is initiated for that subscriber.

In particular, network traffic between signaling points may be routed via a packet switch called an service transfer point (STP) 13. STP 13 routes each incoming message to an outgoing signaling link based on routing information. Further, in particular, the signaling network may utilize an SS7 network implementing SS7 protocol.

Central office switches 11a–11n may also send voice and signaling messages to intelligent peripherals (IP) 17 via voice trunks and signaling channels. IP 17 provides enhanced announcements, enhanced digit collection, and enhanced speech recognition capabilities.

According to an advantage of the present invention, the identity of a caller is authenticated according to voice authentication. Voice authentication is preferably performed by first identifying a subscriber by matching the name or other identifier spoken with a subscriber name or identifier. Next, voice authentication requires verifying that the voice audio signal matches that of the identified subscriber. However, in alternate embodiments, the identity of a subscriber may be authenticated according to passwords, eye scans, encryption, and other security devices.

In particular, to perform subscriber authentication of audio signals received from callers, IP 17 may include storage for subscriber specific templates or voice feature information, for use in authenticating subscribers based on speech. If a subscriber specific template is not stored on a local IP 17, then a remote IP containing the subscriber specific template may be accessed via a network. In addition, local IP 17 may access systems management server 28 or another repository for voice imprints to access the subscriber specific template.

Where IP 17 authenticates the identity of a caller (e.g. the subscriber placing a call), a voice identifier (VID) representing the authenticated caller identity is transferred as a signal for identifying the caller. In addition, where IP 17 authenticates the identity of a callee (e.g. the subscriber receiving a call), a reverse VID (RVID) including the callee identity is transferred as a signal for identifying the callee.

Advantageously, VIDs indicate through text, voice, or video the identity of a caller. For example, a callerIs name may be transferred as the identity of a caller. Alternatively, a video clip stored with the subscriber template may be transferred as the identity of a caller. Additionally, VIDs may indicate the identity of the device utilized by a caller to provide context for a call. Further, VIDs may indicate which system or systems have authenticated the caller identity.

After a VID and/or RVID are determined by IP 17, IP 17 and SCP 15 may communicate to designate which services are available according to VID and RVID. Advantageously, by designating services according to a VID and/or RVID, subscribers are provided with services and billed for those services independent of the devices utilized by subscribers. In particular, a 1129 protocol or other protocol may be utilized to enable signal communications between IP 17 and SCPs 15. In addition, as previously described, caller authentication to determine VIDs and RVIDs may be performed by a third party, such as telco application server 22.

An origin telephony device or destination telephony device may also determine a VID and/or RVID for the caller and/or callee of a call. In particular, telephony devices 8a–8n and call centers 16a–16n may function as origin and designation telephony devices. Each of the telephony devices may include a database of voice templates that may be matched to authenticate the identity of a caller or callee. In addition, each of the telephony devices may access a third party, such as telco application server 22, to authenticate the identity of the caller or callee. In either case, the telephony device transmits a VID and/or RVID with a call to PSTN 10.

Telephony devices 8a–8n may include, but are not limited to wireline devices, wireless devices, pervasive device equipped with telephony features, a network computer, a facsimile, a modem, and other devices enabled for network communication. Advantageously, as previously described, a voice authentication functioning device may be included in each of telephony devices 8a–8n.

However, in addition to authentication according to voice identification and recognition, telephony devices 8a–8n may be equipped to receive other biometric type input. For example, telephony devices 8a–8n include an eye print scanner, a fingerprint scanner, and other devices that detect individual human characteristics. Preferably, telephony devices 8a–8n may receive these other types of biometric input and compare other types of biometric input with previous recorded samples to determine the identity of a caller.

In addition, telephony devices 8a–8n may each incorporate a display that provides a visual output of a VID or RVID. Alternatively, such a display may be provided in a separate device connected to the line in parallel to telephones 8a–8n. According to one advantage of the present invention, the identity of the actual caller or actual callee are output to a display in association with a call. In addition, other context information about the caller including, but not limited to, the device from which the call originates or is answered, ratings for a caller or callee, and other context information may be output to a display in association with a call.

Telephony devices 8a–8n are communicatively connected to PSTN 10 via wireline, wireless, ISDN, and other communication links. Preferably, connections to telephony devices 8a–8n provide digital transport for two-way voice grade type telephone communications and a channel transporting signaling data messages in both directions between telephony devices 8a–8n and PSTN 10.

In addition to telephony devices 8a–8n, advanced telephone systems, such as call centers 16a–16n, may be communicatively connected to PSTN 10 via wireline, wireless, ISDN and other communication links. Call centers 16a–16n may include PBX systems, hold queue systems, private network systems, and other systems that are implemented to handle distribution of calls to multiple representatives or agents.

Returning to central office switches 11a–11n, typically, one central office switch exists for each exchange or area served by the NXX digits of an NXX-XXXX (seven digit) telephone number or the three digits following the area code digits (NPA) in a ten-digit telephone number. The service provider owning a central office switch also assigns a telephone number to each line connected to each of central office switches 11a–11n. The assigned telephone number includes the area code (NPA) and exchange code (NXX) for the serving central office and four unique digits (XXXX).

Central office switches 11a–11n utilize office equipment (OE) numbers to identify specific equipment, such as physical links or circuit connections. For example, a subscriberIs line might terminate on a pair of terminals on the main distribution frame of one of central office switches 11a–11n. The switch identifies the terminals, and therefore a particular line, by an OE number assigned to that terminal pair. For a variety of reasons, a service provider may assign different telephone numbers to the one line at the same or different times. For example, a local carrier may change the telephone number because a subscriber sells a house and a new subscriber moves in and receives a new number. However, the OE number for the terminals and thus the line itself remains the same.

On a normal call, a central office switch will detect an off-hook condition on a line and provide a dial tone. The switch identifies the line by the OE number. The central office switch retrieves profile information corresponding to the OE number and off-hook line. Then, the central office switch receives the dialed digits from the off-hook line terminal and routes the call. The central office switch may route the call over trunks and possibly through one or more central office switches to the central office switch that serves the called partyIs station or line. The switch terminating a call to a destination will also utilize profile information relating to the destination, for example to forward the call if appropriate, to apply distinctive ringing, etc.

In the present invention, when a central office switch detects a pickup condition from a destination device on a line, the central office switch will then determine if a VID signal is transferred from the pickup telephony device. If a VID is transferred, then a query is made to SCP 15 according to the VID for any services specified for the authenticated subscriber. Alternatively, a query may be transferred via network 20 to an external server, such as system management server 28, to determine the services specified for the caller. The central office switch will then receive the dialed digits from the off-hook line terminal and route the call, providing services according to those preferred by the authenticated subscriber.

In addition, an RVID may be provided in the present invention to authenticate the identity of a callee receiving the call. When a call is answered, the call is transferred back to an IP or telco application server 22 to authenticate the identity of the callee answering the call.

As another alternative to dialed digits from the off-hook line terminal, a caller may utilize a voice calling function of a telephony device for indicating how the call should be routed. For example, a caller may say the name of a preferred callee. The device or IP 17 may determine a person within the callerIs calling list that matches the voiced name. The matching personIs digits are then utilized to route the call.

VID Authentication Context

Figure 2:
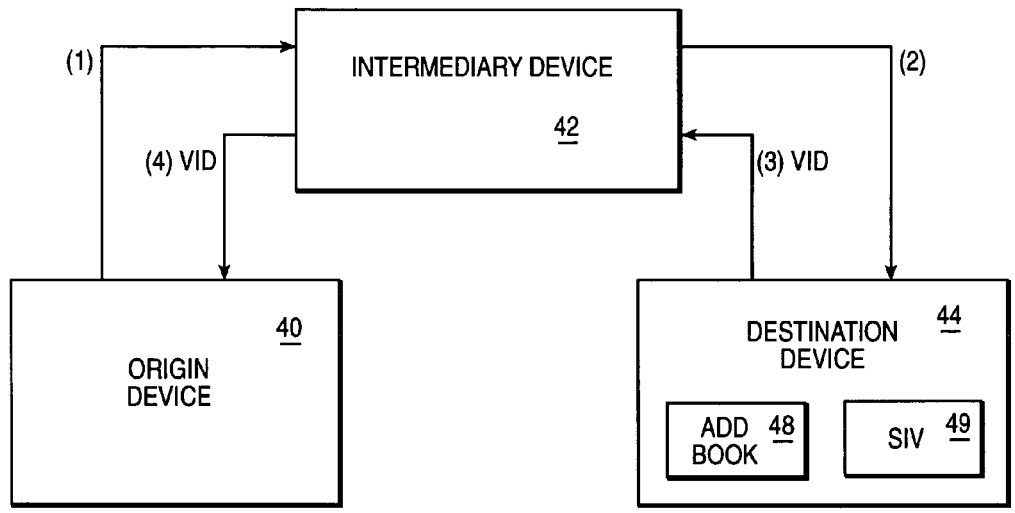
FIG. 2 illustrates a block diagram of the flow of a voice identifier authenticated by a destination device in accordance with the method, system, and program of the present invention.

Referring now to FIG. 2, there is illustrated a block diagram of the flow of a voice identifier authenticated by a destination device in accordance with the method, system, and program of the present invention.

As depicted, an origin device 40 is utilized to place a call via an intermediary device 42 to a destination device 44. In particular, origin device 40 may include a caller telephony device, as previously described. However, origin device 40 may also include a PBX, call center or other private switching system that manages multiple telephony devices. Moreover, origin device 40 may include network servers, feature servers, and other systems which provide call origination. While in the present embodiment origin device 40 does not authenticate the identity of a caller, in alternate embodiments, origin device 40 may include an identity authentication feature.

Preferably, an identifier for origin device 40 may be transferred with a call request to intermediary device 40. Alternatively, an identifier for origin device 40 may be determined by intermediary device 42. The identifier may indicate the type of device and the line subscriber for a device, if available. The device identifier may be transmitted to destination device 44 to provide context for a call. For example, if Jane is calling from JonIs cellular telephone, then such context may be provided to the destination device.

In particular, intermediary device 42 may include a PSTN switching network. However, intermediary device 42 may also include a PBX, call center or other private switching system. Moreover, intermediary device 42 may include network servers, telco application servers, Websphere7 (Websphere7 is a registered trademark of International Business Machines, Inc.) servers, and other systems which provide call processing.

In the present embodiment, intermediary device 42 provides services to the caller according to the services provided to the subscriber wireline or wireless number. However, in alternate embodiments, authentication of a caller identity may be performed at origin device 40 and/or intermediary device 42, wherein a VID may be utilized to specify services available to a particular caller.

Intermediary device 42 connects origin device 40 with a destination device 44. In particular, destination device 44 may include a callee telephony device, as previously described. However, destination device 44 may also include a PBX, call center, or other private switching system that manages telephony devices. Moreover, destination device 44 may include network servers, feature servers, client side devices, and other systems which provide call receipt.

A service identification/verification (SIV) 49 feature within destination device 44 may determine the identity of a caller and authenticate that identity in a VID by comparing a voice utterance made by a caller with an address book of voice samples 48 stored at destination device 44. The voice utterance may include, for example, the callerIs name and the callerIs service provider.

Destination device 44 advantageously includes a display device or other output interface for output of the authenticated VID to the callee, such that the identity of the caller of an incoming call is provided to the callee. The callee may then decide whether to speak to the caller, transfer the caller to voice mail, or end the call.

In addition to output of the caller VID at destination device 44, the caller VID may be transferred back to intermediary device 42 and origin device 40. The caller VID may be transferred back to origin device 40 prior to display at destination device 44, such that the caller is able to verify that the VID is in fact the identity of the caller. In addition, the caller VID may be utilized by intermediary device 42 to specify services available to the caller.

Further, the VID may be filtered by SIV 49 prior to transfer to intermediary device 42. In particular, a callee may store information on destination device 44 in association with the VID that the callee does not want distributed to intermediary device 42, but would like to receive personally. Filtering the VID preferably limits the content of the VID transferred to intermediary device 42.

In addition to the VID including a caller identity as determined at destination device 44, additional context information received from a call may be combined with the VID. By providing a callee with the context of a call in addition to the identity of the caller, the callee may more carefully determine how to respond to a call.

A VID may be transferred in multiple protocols, including, but not limited to, Interface Definition Language (IDL). A VID may include a range of information, where each type of information may be tagged or identified in some other manner. For example, the following tagged VID may be transmitted to represent an authenticated identity of a caller:

[name] Jon Smith

[device] Jane DoeIs cell phone

[location] Central Time zone

[subject] Project A

[authenticated by] Jane DoeIs cell phone

Destination device 44 may output all the information included in a VID or a selection of the information. For example, for the tagged VID described above, destination device 44 may output the following to an input/output interface associated with destination device 44:

AIncoming call from Jon Smith, using Jane DoeIs cell phone, in reference to Project A@

In addition, destination device 44 may interpret the information included in a VID. For example, for the tagged VID described above, destination device 44 may interpret the location and output the following:

AIt is currently 4:00 PM at Jon SmithIs location@

Further, destination device 44 may perform other functions with a VID. For example, destination device 44 may translate the VID into a particular language. In addition, destination device 44 may request additional information for a VID from a third party server.

Figure 3:
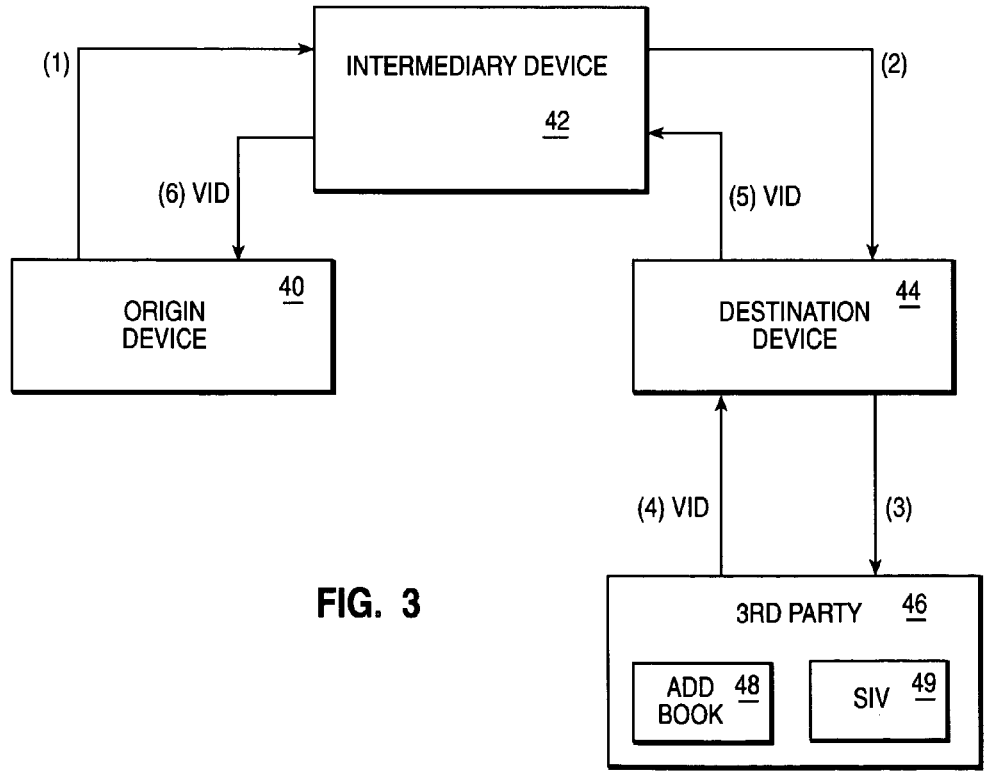
FIG. 3 depicts a block diagram of the flow of a voice identifier authenticated by a third party device accessible from a destination device in accordance with the method, system, and program of the present invention.

With reference now to FIG. 3, there is depicted a block diagram of the flow of a voice identifier authenticated by a third party device accessible from a destination device in accordance with the method, system, and program of the present invention.

As illustrated, destination device 44 may access a third party device 46 with a request for VID authentication. Third party device 46 may include a telco application server, accessible via a network, that performs caller authentication. However, third party device 46 may also be a stand alone system or a server connected to a PBX, a private switching system, or a service provider switching system.

Third party device 46 may include an SIV 49 feature that receives a voice utterance made by a caller at origin device 40 and authenticates an identity of a caller associated with the voice utterance by comparing the voice utterance with a voice sample database 50 stored at third party device 46, or accessible thereto. Third party device 46 then returns a VID containing the identity of the caller. Destination device 44 may add additional information received with the call to the VID to provide context for the call.

Communications between destination device 44 and third party device 46 may be facilitated by intermediary device 42. In addition, communications between destination device 44 and third party device 46 may be facilitated by a network, such as the Internet, an Intranet, or a private networking service.

SIV 49 may implement levels of security in communications with destination device 44. For example, a secure channel utilizing a secure socket layer may be implemented. In addition, other encryption techniques may be implemented for transfer of information.

Alternatively, destination device 44 may access a database of voice samples stored at third party device 46. Where destination device 44 requests voice samples from third party device 46, destination device 40 may, for example, request a selection of voice samples for a name identified from a voice utterance. Destination device 44 then authenticates a VID for the caller.

In an example, a voice utterance provided by a caller may include a name and a service provider from which the caller receives service. Destination device 44 may then contact the third party service provider device 46 and request either an authentication of the voice utterance or voice samples for a name identified from the voice utterance. The third party service provider advantageous stores voice samples for each customer, such that identity authentication may be performed.

Figure 4:
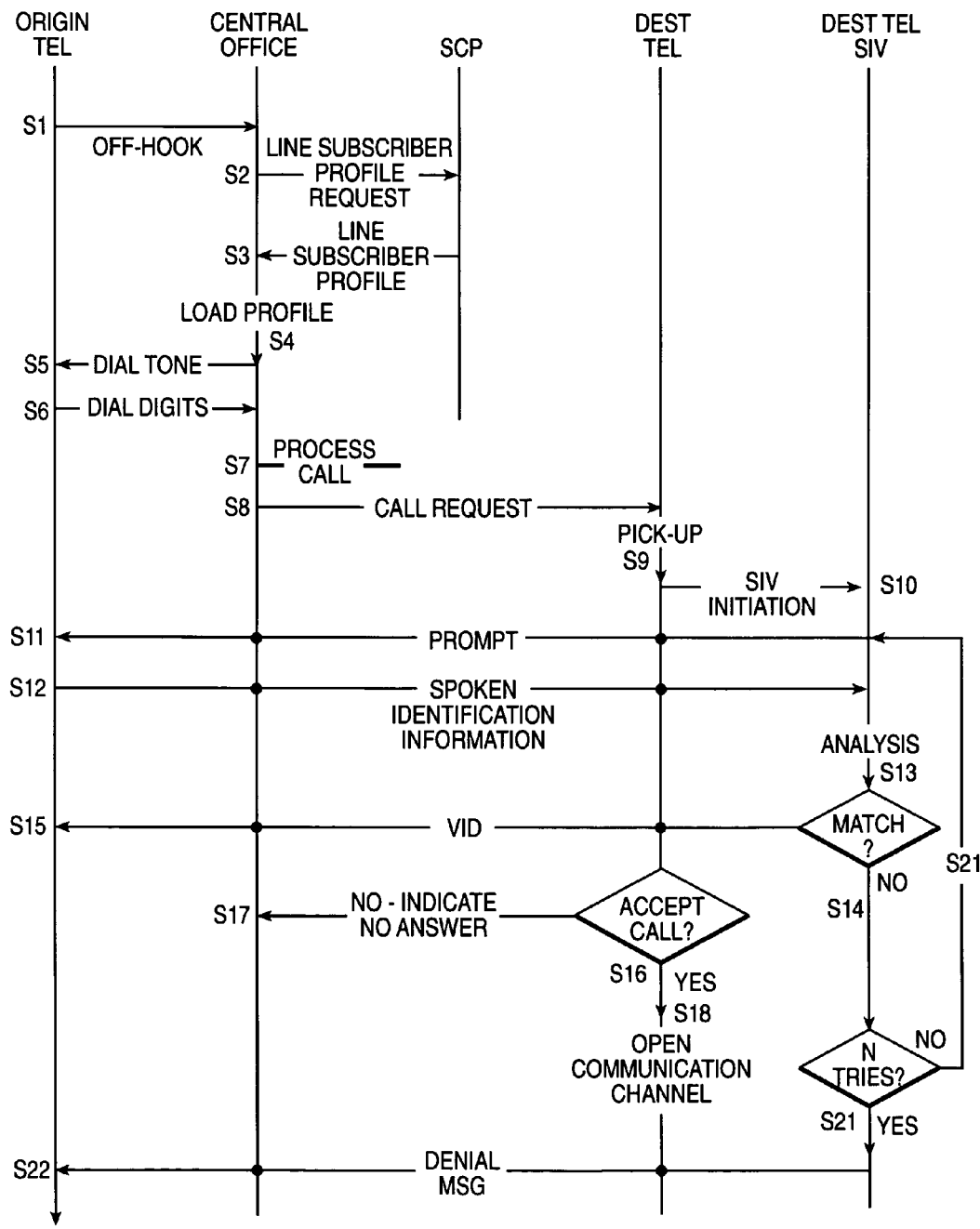
FIG. 4 illustrates a flow diagram of a signal flow and processing where a destination device authenticates a caller identity in accordance with the method, system, and program of the present invention.

Referring now to FIG. 4, there is illustrated a flow diagram of a signal flow and processing where an origin device authenticates a caller identity in accordance with the method, system, and program of the present invention. A standard telephone device is assumed for the origin Atel@ device in the present example. However, a similar signal flow may be applied to other types of origin devices.

The caller lifts a handset creating an off-hook state in the origin device and a corresponding signal of an off-hook or change of state is transferred to a central office (step S1). In response to the off-hook signal received at the central office, the central office may initiate a call and establish a register for the origin device. Next, a profile request for the line subscriber from the SCP is requested (step S2). The profile request preferably includes services available for a particular wireline or wireless number. The line subscriber profile is searched for in the SCP and returned to the central office (step S3). The line subscriber profile is then loaded into the call register for specifying service available for the call (step S4) and a dial tone is extended to the origin telephone (step S5). Digits for identifying a destination line are returned to the central office from the origin telephone (step S6).

Processing of the call may begin by switching the call to the central office that services the requested wireline or wireless number (step S7). A call request is extended from the central office to the destination telephone (step S8).

When a destination telephone receives a call request, the destination telephone may answer the call (step S9). Alternatively, the call may be answered by a messaging service or answering machine after a particular amount of time. The call is then transferred to the destination telephone SIV component (step S10). The SIV then initiates an identity authentication process for authenticating the identity of the current caller. Further, the central office may trigger a SIV initiation to an IP at other times during a call.

First, the SIV provides a prompting instruction to the caller to provide specific identifying information (step S11). It should be mentioned that although the SIV could passively monitor any speech that the caller may utter, it is advantageous to specifically prompt the caller. For example, the SIV may play an audio prompt message asking the caller to APlease say your full name.@ In addition, the prompt may request other identifying information such as a service provider and subject of the call, for example. In particular, the caller prompt is transferred from the origin telephone, through the intermediary central office, to the origin telephone.

A spoken utterance by the caller at the origin telephone provides spoken identification information that is transferred to the destination telephone, and routed to the destination telephone SIV (step S12). Analysis is performed on the spoken identification information to determine a name of a caller and extract speech characteristics information (step S13). A voice template or other voice pattern information may be stored in the destination device according to a caller identity. In addition, voice template information may be stored at a third party server accessible to the destination device. Preferably, the SIV compares the extracted speech information to the stored pattern information, to identify and authenticate the particular caller (step S14). If there is a match between the extracted speech information and the stored pattern information, then a VID signal containing the authenticated identity of the caller is distributable among multiple devices (step S15). In particular, the VID is output at the destination device, such that the callee may decide whether to speak to the caller. However, the VID may also be output to the origin device, such that the caller may view the identity information provided to the callee.

Once a VID is authenticated for a caller, the callee may decide whether to accept the call (step S16). The callee may indicate acceptance of a call by a keypad or voice entry. If the callee does not accept the call, then the call is transferred back to the central office to be transferred to a messaging service or ended (step S17). If the callee does accept the call, then the communication channel between the caller and the callee is opened at the destination device (step S18).

If there is not a match of the extracted speech information with the voice templates, then a determination is made as to whether a caller has made more than n tries to speak identification information that has not matched (step S21). If the caller has not made more than n tries, then a prompt is output to the caller to provide another spoken utterance. If the caller has made more than n tries, then a denial message is output to the caller (step S22). In addition, instructions for creating a voice template may be provided or an off-hook signal or change in state of the line without an associated VID may be sent to the central office, such that the caller is enabled to place a call utilizing the services associated with the OE of the line.

According to one advantage of the present invention, where a destination device is a PBX system that manages multiple phone lines, the company controlling the PBX system may want to authenticate the identity of callers prior to allowing those callers to access employees via telephone. In another example, where the destination device is a call center that provides access automated financial accounting services, the call center may require account service subscribers to provide a voice sample that is utilized to authenticate a caller identity and determine what services the caller is allowed within the financial account services system.

While not depicted, the central office may utilize the VID authenticated by the destination device to update the services provided to a call. In particular, the central office may request a caller profile from the SCP according to the VID. When the VID based caller profile is received, then the line subscriber profile in the register holding the call may be supplemented or replaced by the VID based caller profile to specify the services available during the call.

It should be noted that with each transfer of a VID, the central office, the SCP, and the destination device may each record and filter the VID. In particular, filtering the VID may require blocking all or portions of the content of the VID.

Figure 5A:
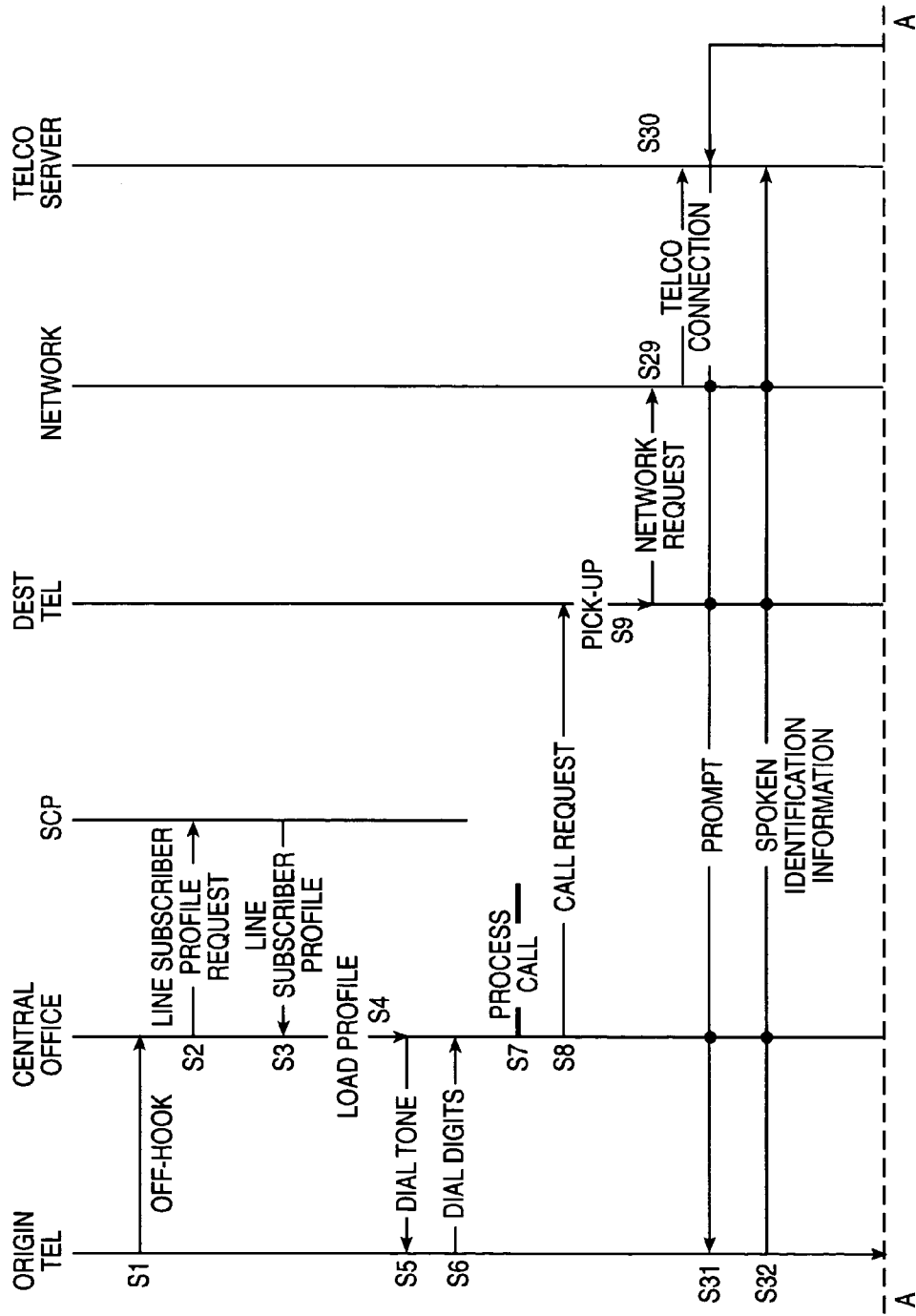
FIG. 5 depicts a flow diagram of a signal flow and processing where a third party system is accessed by a destination device to authenticate a caller identity in accordance with the method, system, and program of the present invention.
Figure 5B:
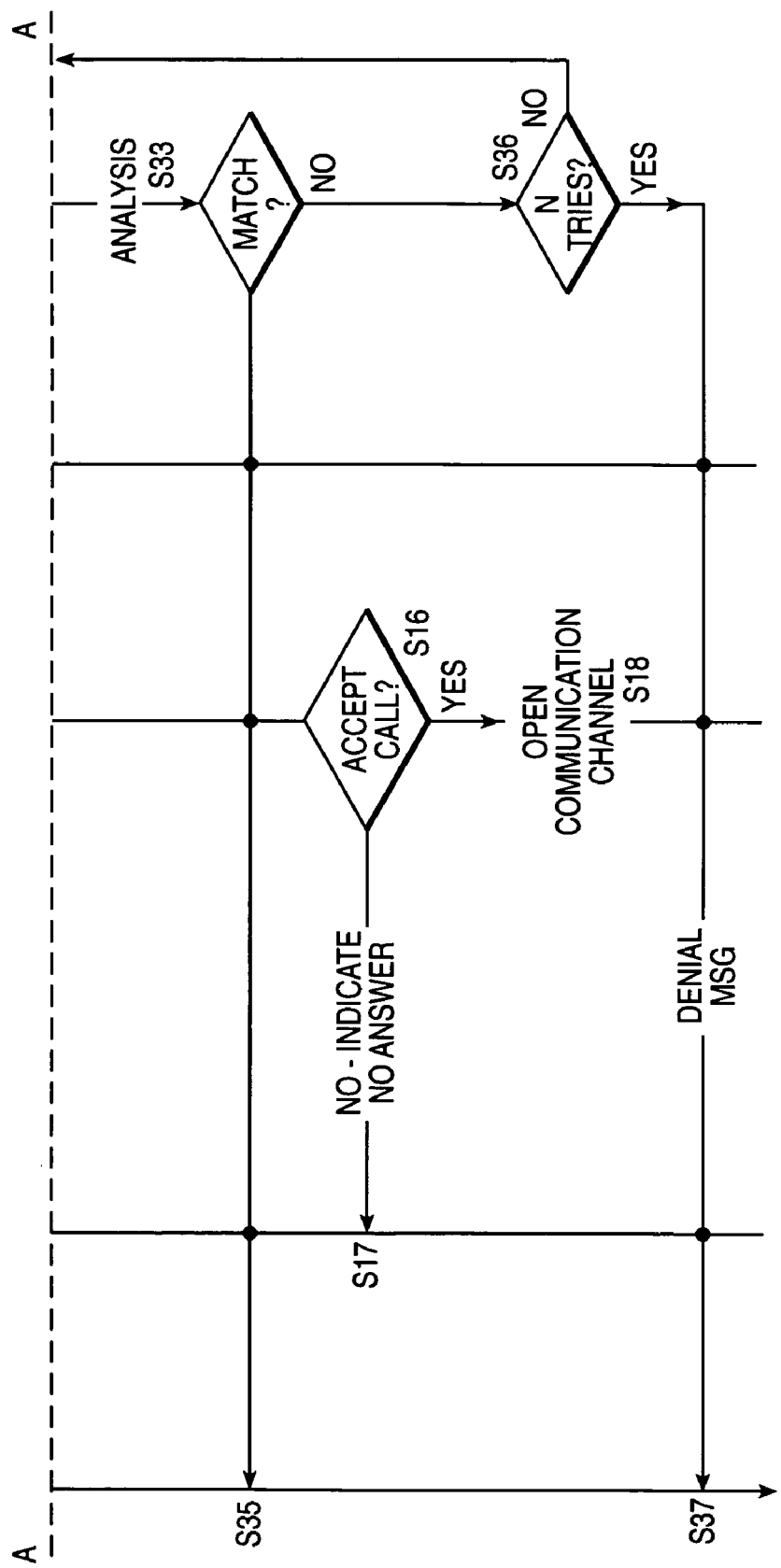

With reference now to FIG. 5, there is depicted a flow diagram of a signal flow and processing where a third party system is accessed by a destination device to authenticate a caller identity in accordance with the method, system, and program of the present invention.

After a destination telephone answers a call (step S9), a telco service request is transferred to a network (step S29) for access to a telco application server (step S30). In particular, the request for a network connection may first transfer to a central office of a switching system that then forwards the call via a network to a telco application server. Alternatively, the destination device may also directly access a network, such as the Internet, to connect with the telco server. A secure channel may be established with the request for a network connection.

In response to receiving a telco service request, the telco application server initiates an identity authentication process for authenticating the identity of the current caller. First, an authorization service application provides a prompting instruction to the caller to provide specific identifying information (step S31). For example, the authorization service application may play an audio prompt message asking the caller to APlease say your full name.@ In addition, the prompt may request other identifying information such as a service provider and subject of the call, for example. The spoken identification information is then received at the origin device and transferred via the network to the telco application server (step S32).

Analysis is performed on the spoken identification information to determine a name of a caller and extract speech characteristics information (step S33). A voice template or other voice pattern information may be accessible to the telco application server from a local or remote database management system. Preferably, the authorization service application compares the extracted speech information to the stored pattern information, to identify and authenticate the particular caller. If there is a match between the extracted speech information and the stored pattern information, then a VID signal containing the authenticated identity of the caller is then distributable among multiple devices (step S35).

If there is not a match of the extracted speech information with the voice templates, then a determination is made as to whether a caller has made more than n tries to speak identification information that has not matched (step 36). If the caller has not made more than n tries, then a prompt is output to the origin telephone to provide another spoken utterance. If the caller has made more than n tries, then a denial message is output to the origin telephone (step 37). In addition, instructions for creating a voice template may be provided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

While the invention has been particularly shown and described with reference to a preferred embodiment, it will be understood by those skilled in the art that various changes in form and detail may be made therein without departing from the spirit and scope of the invention.

What is claimed is:

1. A method for identifying a particular caller, said method comprising:
   responsive to detecting a call extended to a destination device, extending a request from said destination device to an origin device requesting a voice utterance of the caller utilizing said origin device;
   identifying, at said destination device, a caller identity associated with said voice utterance, such that a callee receiving said call at said destination device is informed of said caller identity before speaking with said caller;
   sending said caller identity back to an intermediary device processing said call, wherein said intermediary device is enabled to forward said caller identity to said origin device utilized by said caller; and
   receiving a verification of said caller identity from said origin device.

2. A system for identifying a particular caller, said system comprising:
   a destination telephony device;
   means responsive to detecting a call extended to said destination telephony device, for extending a request from said destination telephony device to an origin device requesting a voice utterance of the caller utilizing said origin device;
   means for identifying, at said destination telephony device, a caller identity associated with said voice utterance;
   means for sending said caller identity back to an intermediary device processing said call, wherein said intermediary device is enabled to forward said caller identify to said origin device utilized by said caller; and
   means for receiving a verification of said caller identity from said origin device.

* * * * *